Aug. 2, 1938.  M. KADAS  2,125,378

TANK TRUCK GROUNDING DEVICE

Filed Nov. 22, 1937

Inventor
Michael Kadas
By Williamson & Williamson
Attorneys

Patented Aug. 2, 1938

2,125,378

UNITED STATES PATENT OFFICE 2,125,378

TANK TRUCK GROUNDING DEVICE

Michael Kadas, Farmington, Minn.

Application November 22, 1937, Serial No. 175,883

3 Claims. (Cl. 175—264)

My invention relates to static grounding devices for metallic portions of vehicles normally insulated from the ground.

To avoid the danger of discharge of static electricity accumulated on metallic portions of rubber-tired vehicles igniting inflammable or explosive cargoes of such vehicles it is common to provide static-grounding devices to carry static electrical charges to the ground beneath the vehicles and thus prevent accumulation of an appreciable charge on the metallic parts of the vehicles. Ordinarily such devices consist of chains depending from the vehicles and dragging at their lower ends on the ground. Such chains are subject to extremely rapid wear of the lower links thereof and to loss of badly worn links and hence not only necessitate frequent repair and replacement with the expense and inconvenience incidental thereto, but, also, are unreliable and conducive to hazard due to the possibility of a chain which is badly worn or has lost its lower links not engaging the ground and hence permitting accumulation of a dangerous charge of static electricity.

It is an object of my invention to provide a static-grounding device for vehicles which is particularly reliable and particularly resistant to wear.

Another object is to provide such a device which will produce a minimum of noise.

Still another object is to provide such a device wherein the ground engaging element consists of a wheel and which is arranged to maintain the wheel in contact with the ground and substantially immune from damage during movements of the associated vehicle forwardly, rearwardly, around curves, and over rough ground.

A further object is to provide such a device of simple, light, compact, rugged and inexpensive construction.

These and other objects and advantages of the invention will be more fully set forth in the following description made in connection with the accompanying drawing, in which like reference characters refer to similar parts throughout the several views, and, in which:—

Figure 1:
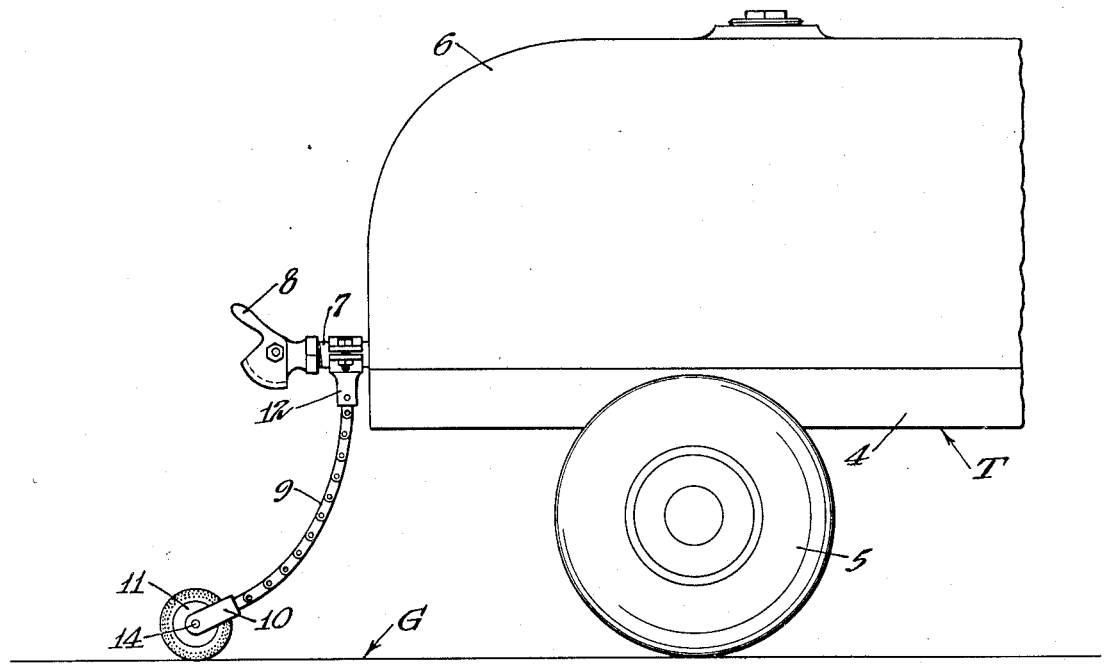
Fig. 1 is a side view of the rear portion of an oil tank truck having an embodiment of my invention operatively associated therewith.

Referring to the drawing, my static-grounding device is shown associated with a truck "T" having a frame 4, rear wheel 5, and a tank 6. The tank 6 may be provided with a rearwardly projecting discharge pipe 7 having a valve 8 on its free end.

My device includes means attachable to some metallic portion of a vehicle, a chain 9 connected at its upper end to the attachment means and carrying a fork 10 on its rear end. The fork 10 has a ground engaging wheel 11 rotatably mounted therein.

For convenient attachment to a pipe, such as pipe 7, I provide a split collar 12 having a cap portion 12a connected to the main portion by means of clamping bolts 13 so that the collar 12 may be placed in encircling relation with a pipe, such as pipe 7, whereafter the clamping bolts 13 may be drawn up to securely anchor and electrically connect the clamping collar 12 to the pipe 7. The clamp 12 has formed thereon depending means for mechanical and electrical connection of a chain thereto. This depending means may consist of a pair of lugs 12b spaced apart and having aligned apertures in the respective ones thereof.

Figure 2:
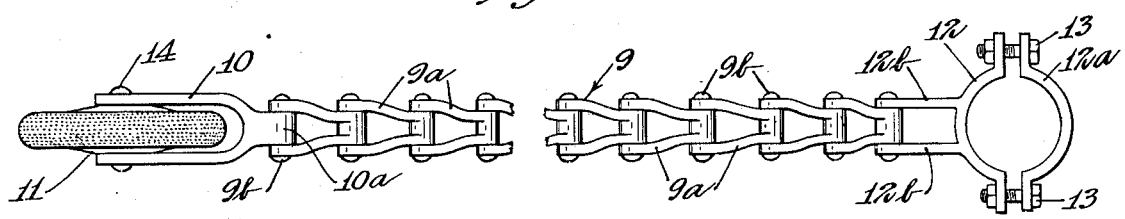
Fig. 2 is a broken view of the embodiment of my device shown in Fig. 1 when the device is detached from the vehicle.
Figure 3:
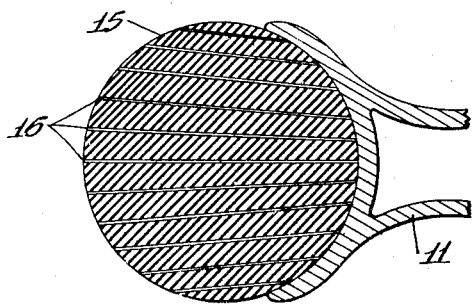
Fig. 3 is a partial sectional view of the wheel and tire of the device.

The chain 9 is of a type which cannot twist to an appreciable extent with reference to its longitudinal axis. A suitable form for the chain 9 is illustrated in Fig. 2, and consists of links 9a connected one to another by means of pivot pins 9b so that one link may swing relative to an adjacent link only about the axis of the pivot pin 9b connecting said one link to said adjacent link. Each of the links 9a is of generally U-shaped form with apertures in the free end portions of the respective legs of the U and an aperture through the portion connecting the respective legs, so that the pivot pin 9b may be extended through aligned apertures in the free end portions of one link 9a and the leg connecting portion of an adjacent link. The fork 10 includes a portion 10a similar to the leg connecting portion of one of the links 9a. This portion 10a of the fork 10 is connected to the last link 9a at the free end of the chain 9 by means of a pivot pin 9b as shown. An axle 14 is mounted in suitable apertures in the free end portions of the respective legs of the fork 10. The wheel 11 is rotatably mounted on the axle 14. The wheel 11 may, of course, be mounted on the axle 14 by means of any conventional type of wheel bearing. The wheel 11 carries on its periphery a tire 15 which may be formed of compressible elastic material such as rubber. The tire 15 has electrically conductive elements 16 disposed at the peripheral surface thereof, and secured thereto, as for example, by embedding the elements 16 in the material of the tire 15. The elements 16 are electrically connected to the wheel 11, which preferably is constructed of electrically conductive material, so as to be in electrical communication through the fork 10 the chain 9 and the clamp 12 with the metallic portions of the truck "T". The elements 16 may be electrically connected to the wheel 11 by extending the elements 16 through the tire 15 to a point on the inner side thereof where the extensions of elements 16 will be in electrical contact with the wheel 11.

It is apparent from the above description that the chain 9 is flexible in a vertical plane parallel to the longitudinal axis of the truck "T" so that the wheel 11 may readily follow irregularities in the surface of the ground "G" upon which the truck "T" may be moved. It is also apparent that the chain 9 is substantially non-twistable so as to maintain the axle 14 in a substantially horizontal position so that the wheel 11 and tire 15 will be maintained in position to roll over the surface of the ground "G". Should the truck "T" be backed up the chain 9 and wheel 11 may remain in the positions thereof shown in Fig. 1, or may change in position so that the chain 9 will curve downwardly and toward the rear wheel 5 of the truck "T". It will be appreciated that the chain 9 is not subjected to wear such as would be occasioned by contact thereof with a road surface, and that the principal wear occurring in the device will consist only of gradual wearing down of the tire 15 which may be easily and quickly replaced with very little expense. The rubber tire 15 will not cause a great amount of noise from movement over the ground or over pavements of various kinds, and yet the metallic elements 16 will maintain electrical communication between the chain 9 and the ground.

It is apparent that I have invented a novel, simple, compact, rugged and inexpensive form of static-grounding device which is particularly free from wear. I am aware that my device may be attached at its upper end to a vehicle at various points other than that illustrated in the drawing and by various means other than the particular form of clamp shown in the drawing. My device is applicable for use in connection with trucks carrying gasoline, oil, explosives, or other inflammable material.

It will, of course, be understood that various changes may be made in the form, details, proportions and arrangements of the parts without departing from the scope of my invention, which, generally stated, consists in a device capable of carrying out the objects above set forth, and in the novel parts and combinations of parts disclosed and defined in the claims.

What is claimed is:

1. The combination with a vehicle insulated from the ground of a static-grounding device comprising, a series of electrically conductive elements swingably connected together in general end-to-end relation to form an elongated member appreciably flexible in only one plane, means mechanically and electrically connecting said member at one end thereof to said vehicle to depend therefrom with said plane disposed vertically and parallel to the normal direction of travel of said vehicle, and a revoluble electrically conductive element mechanically and electrically connected to the free end of said member for rotation relative thereto about an axis disposed horizontally and normal to said direction of travel whereby said revoluble element may roll upon the ground over which said vehicle travels.

2. The combination with a vehicle insulated from the ground of a static-grounding device comprising, an electrically conductive chain constructed to be appreciably flexible in only one plane, means mechanically and electrically connecting said chain at one end thereof to said vehicle to depend therefrom with said plane disposed vertically and parallel to the normal direction of travel of said vehicle, and a revoluble electrically conductive element mechanically and electrically connected to the free end of said chain for rotation relative thereto about an axis normal to said plane whereby said revoluble element may roll upon a surface over which said vehicle travels.

3. The combination with a vehicle insulated from the ground of a static-grounding device including, an electrically conductive chain secured at one end thereof to said vehicle to depend therefrom and comprising a series of rigid elements and a series of horizontally axised pivot means connecting successive ones of said rigid elements in end-to-end relation, a horizontally disposed axle carried by the free end of said chain, and an electrically conductive revoluble element rotatably mounted on said axle to roll upon a surface over which said vehicle travels.

MICHAEL KADAS.